(12) United States Patent
Öberg et al.

(10) Patent No.: US 7,873,371 B2
(45) Date of Patent: Jan. 18, 2011

(54) CONTROL SYSTEM CONTROLLING A PLURALITY OF REAL WORLD OBJECTS, AND A METHOD FOR HANDLING MESSAGES FROM A MOBILE USER CONNECTED TO THE CONTROL SYSTEM

(75) Inventors: Pierre Öberg, Västerås (SE); Robert Markic, Ringwood (AU)

(73) Assignee: ABB Research Ltd., Zürich (CH)

( * ) Notice: Subject to any disclaimer, the term of this patent is extended or adjusted under 35 U.S.C. 154(b) by 125 days.

(21) Appl. No.: 10/538,384

(22) PCT Filed: Dec. 12, 2002

(86) PCT No.: PCT/SE02/02340

§ 371 (c)(1),
(2), (4) Date: Apr. 3, 2006

(87) PCT Pub. No.: WO2004/053609

PCT Pub. Date: Jun. 24, 2004

(65) Prior Publication Data

US 2006/0205389 A1    Sep. 14, 2006

(51) Int. Cl.
*H04Q 7/20* (2006.01)
(52) U.S. Cl. .............. 455/456.3; 455/412.1; 455/412.2; 455/414.3; 455/456.1; 455/456.2
(58) Field of Classification Search ................. 455/412, 455/454, 575, 26.1, 412.2, 408, 406, 407, 455/412.1, 414.3, 414.1, 414.2, 456.1, 456.2, 455/456.3, 457, 66.1
See application file for complete search history.

(56) References Cited

U.S. PATENT DOCUMENTS

| | | | |
|---|---|---|---|
| 6,636,748 B2 * | 10/2003 | Monroe | 455/556.1 |
| 2002/0052750 A1 * | 5/2002 | Hirooka | 705/1 |
| 2002/0057340 A1 * | 5/2002 | Fernandez et al. | 348/143 |
| 2002/0077114 A1 * | 6/2002 | Isham | 455/454 |
| 2002/0087220 A1 * | 7/2002 | Tveit et al. | 700/22 |
| 2003/0045269 A1 * | 3/2003 | Himmel et al. | 455/408 |
| 2003/0061606 A1 * | 3/2003 | Hartwig et al. | 725/25 |
| 2003/0216137 A1 * | 11/2003 | Hymel | 455/412.1 |

FOREIGN PATENT DOCUMENTS

| | | | |
|---|---|---|---|
| EP | 0854417 A2 | 7/1998 |
| EP | 0893902 A2 | 1/1999 |
| EP | 1207450 A2 | 5/2002 |
| WO | WO 0102953 A1 | 1/2001 |

* cited by examiner

*Primary Examiner*—Vincent P Harper
*Assistant Examiner*—Fred A Casca
(74) *Attorney, Agent, or Firm*—Venable LLP; Eric J. Franklin

(57) ABSTRACT

A method for handling messages from a mobile user, in a control system controlling a plurality of real world objects, wherein the real world objects are represented by software objects and the user selects one of the objects for the message. The method includes receiving information about which of the objects has been selected. A voice message is recorded. The message is stored associated with the software object representing the selected real world object, such that the message is accessible from the control system. The presence of a message associated with the object is indicated. Upon request, the content of the message is presented.

18 Claims, 4 Drawing Sheets

CONTROL SYSTEM CONTROLLING A PLURALITY OF REAL WORLD OBJECTS, AND A METHOD FOR HANDLING MESSAGES FROM A MOBILE USER CONNECTED TO THE CONTROL SYSTEM

FIELD OF THE INVENTION

The present invention relates to a method for handling messages from a mobile user in a control system, which is controlling a plurality of physical objects. The present invention also relates to a control system able of handling messages from a mobile user. The method and the control system according to the invention are particularly suitable for use in an industrial plant, such a as a power plant, a chemical plant, an oil refinery, a pulp and paper mill, a steel mill, or in a power distribution network.

PRIOR ART

In most industrial plants, control systems are used to monitor and control many different objects. The objects controlled are, for example, a tank, a motor, a valve, a sensor, or a product, such as a roll of paper or a car. The control system of the plant usually has a centralized control room housing a number of controllers and operator stations. The plant is mainly supervised from the control room. The control room is equipped with monitors showing the objects to be supervised and delivers data, such as alarms and events, about the objects. This approach is common in industries such as chemical, pharmaceutical, food, metal, mines, pulp and paper. Other industries and utilities where the same approach is used are automotive, consumer products, power generation, power distribution, waste water handling, oil refineries, gas pipe-lines and off-shore platforms.

It sometimes happens that one of the operators of the control system wants to leave a message in connection with one of the supervised objects, for example, as a reminder to himself or to another operator working on a different shift. Today, it is possible to type a message on one of the computers in the control room and store it associated with one of the objects. The presence of a message is indicated on the screen and can be read by any person having access to the control system.

Most of the monitoring and controlling of the plant are carried out in the centralized control room. However, even in these automated systems, situations arise when an operator would have to physically visit the site. For example, the operator inspects a machine, gathers data from measuring instruments, change set-points, or make other adjustments. In many plants, the operators regularly leave the control room for inspection of the plant. During his visit in the plant, the operator will most likely spot many things that he would like to note or bring to someone's attention. Thus, there is a need for a possibility to leave messages about the real world objects when the operator is out of the control room. Examples of real world objects are valves, pipes, motors, switchgear, cables, protection entities, mixers, reactors, a raw material, a product, an assemble of products or a batch. Today, the operator has to write down the notes on a piece of paper and then feed the notes to the control system, when he is back in the control room. This method is time consuming and not safe, since there is a risk that the notes are lost or never fed into the control system. The following documents describe the background art, but none of them proposes any solution to the above problem.

WO Patent Application 01/02953 entitled "Method of integrating an application in a computerized system" describes a method to represent real world objects in a computerized system in a systematic way, in which different types of information about the real world object may be obtained, linked to the real world object, processed, displayed, and acted on. In WO 01/02953 real world object is represented of a certain kind of software object called a composite object. Each application integrated in the computerized system defines interfaces that are independent of the implementation of the application itself. These interfaces may be used by other applications, implementing other aspects or groups of aspects of a composite object, such that the applications can co-operate to provide functionality for the representation of real world entity that is a sum of all aspects. Another term for such a composite object is an Aspect Object. The term Aspect Object is used in this application.

EP 1207450 entitled "Display system for industrial automation" relates to an industrial automation computer display, which presents cumulative or sequential messages to the user through a navigator and with audio-visual feedback. The messages related to fault causing events are stored and the last message is displayed in a space saving manner in the navigator.

EP 0854417 entitled "Voice-activated control unit" relates to a handheld wireless voice-activated device for controlling a host system. The device has a display, a microphone, a wireless transmitter, and a receiver.

OBJECTS AND SUMMARY OF THE INVENTION

The object of the present invention is to enable a mobile user to remotely create and store a message associated with a selected object in an industrial plant supervised and controlled by the control system, which message is possible to retrieve from the control room.

This object is achieved by a method comprising receiving information about the identity of the selected object, recording a voice message, storing the message associated with a software object representing the selected real world object and storing the message so that the message is accessible from the control system, indicating the presence of a message associated with the object, and upon request presenting the content of the message. Thus, if the operator wishes to make a note about an object when he is inspecting the plant, he simply records his message and the message is stored associated with a software object representing the selected real world object. The message is stored such that it is easily accessible from any user interface connected to the control system. The stored messages may serve as an input for maintenance actions required or instructions to other persons operating the process. A mobile user is a person walking around in the plant visiting machines and equipment. The mobile user is, for example, an operator of the control system, a technician, or an engineer working in the plant.

According to a preferred embodiment of the invention, each software object is an Aspect Object which contains a set of selectable functions representing different aspects of the real world object including displaying information about the object and/or controlling the object, wherein the method comprises the steps: including the functions "record a message" and "present a message" to said set of functions, and the step recording a message comprises: activating the "record a message" function of the object, and the step presenting the message comprises: activating the "present a message" function of the object. The concept of Aspect Objects is a known way of defining software objects representing real world objects in control systems. The functionality of recording and presenting a voice message is easily implemented in a control system using Aspect Objects.

In a preferred embodiment of the invention, the message is recorded by means of a handheld mobile unit having a user interface and being wirelessly connected to the control system. Using such a wireless, handheld unit, the operator can easily walk around in the plant and record messages. It is very cumbersome to write notes on a small, handheld device having a small keyboard or a touch screen that you write on using a pen or a small stick. Most handheld computers already have voice-recording capabilities that could be used in connection with the invention.

According to an embodiment of the invention, objects possible to select are displayed on said user interface of the mobile unit. Thereby, the operator can easily select the object to be associated with the message.

According to a preferred embodiment of the invention, the recorded message is transmitted from the mobile unit to the control system and stored in the control system. One advantage by transmitting the recorded message is that overload of the memory in the mobile unit is avoided.

According to a preferred embodiment of the invention, the message is presented on a second user interface connected to the control system. The second user interface is preferably located in the control room. Thus, the message is accessible for anyone in the control room.

According to a preferred embodiment of the invention, the recording, storing and presenting of the message is achieved by means of one or more software modules common to the software objects in the control system. Due to that all of the software objects use the same software module or modules for the recording, storing, and presenting of the message, those functions are easily implemented in the control system.

According to a preferred embodiment of the invention, presence of a message is indicated in connection with a visual representation of the object. In the control room, a view of the supervised system is shown to the operator and each object is shown as a graphical symbol. The presence of a message in connection with a certain object is indicated by lighting an indicator symbol on or in the close vicinity of the graphical symbol representing the object. Thus, it is easy for the operator to notice if there is a message in connection with a certain object.

According to a preferred embodiment of the invention, the voice message is converted into a text string, which is stored, and upon request, the text string is displayed. Mostly, it is easier for an operator to read a message instead of listening to the message. The recorded message may also be stored as a voice message and upon request the content of the message is presented by playing the voice message. Thus, it is possible for the operator to choose between having the message presented as a text string or as a voice message. Alternatively, the message is stored only as a voice message and presented by playing the voice message.

In a preferred embodiment of the invention, the method comprises assigning a category and a priority to the message and visually indicating the category and priority of the message. It is advantageous to be able to sign a category and a priority to the message, since it adds important information about the message to the operator. The higher priority a message has, the more important is the message.

According to a preferred embodiment of the invention, the method also comprises storing information about who recorded the message, and upon request presenting information about who recorded the message. Sometimes, it is of interest to know which one of the operators who recorded a specific message, and this facility makes it possible to receive such information.

According to a preferred embodiment of the invention, the method comprises automatically deleting the message in dependence of a pre-determined period of time following the recording of the message. To avoid having old, overruled messages in the system and to avoid the trouble of deleting the messages, it is advantageous to have them automatically deleted after a certain period of time.

A further object of the present invention is to provide a computer program for handling messages from a mobile user. This object is achieved by a computer program which, when loaded into a computer, causes the computer to perform the process of the method presented above.

Another object of the present invention is to provide a computer-readable medium having a program recorded thereon for handling messages from a mobile user. This object is achieved by a computer-readable medium having a program recorded thereon, which makes a computer perform the steps of any of the claims 1-13, when said program is run on the computer.

Another object of the present invention is to provide a control system adapted for controlling a plurality of real world objects, which control system makes it easy for a mobile user to create and handle messages in connection with the controlled objects. This object, is achieved by a control system comprising means for selecting one of said objects, means for creating a message, a storage unit for storing the message associated with the software object, means for indicating the presence of the message, and means for, upon request, presenting the content of the message, wherein the message-creating means comprises means for recording a voice message.

BRIEF DESCRIPTION OF THE DRAWINGS

The invention will now be explained more closely by the description of different embodiments thereof and with reference to the appended figures.

DETAILED DESCRIPTION OF PREFERRED EMBODIMENTS OF THE INVENTION

Figure 1:
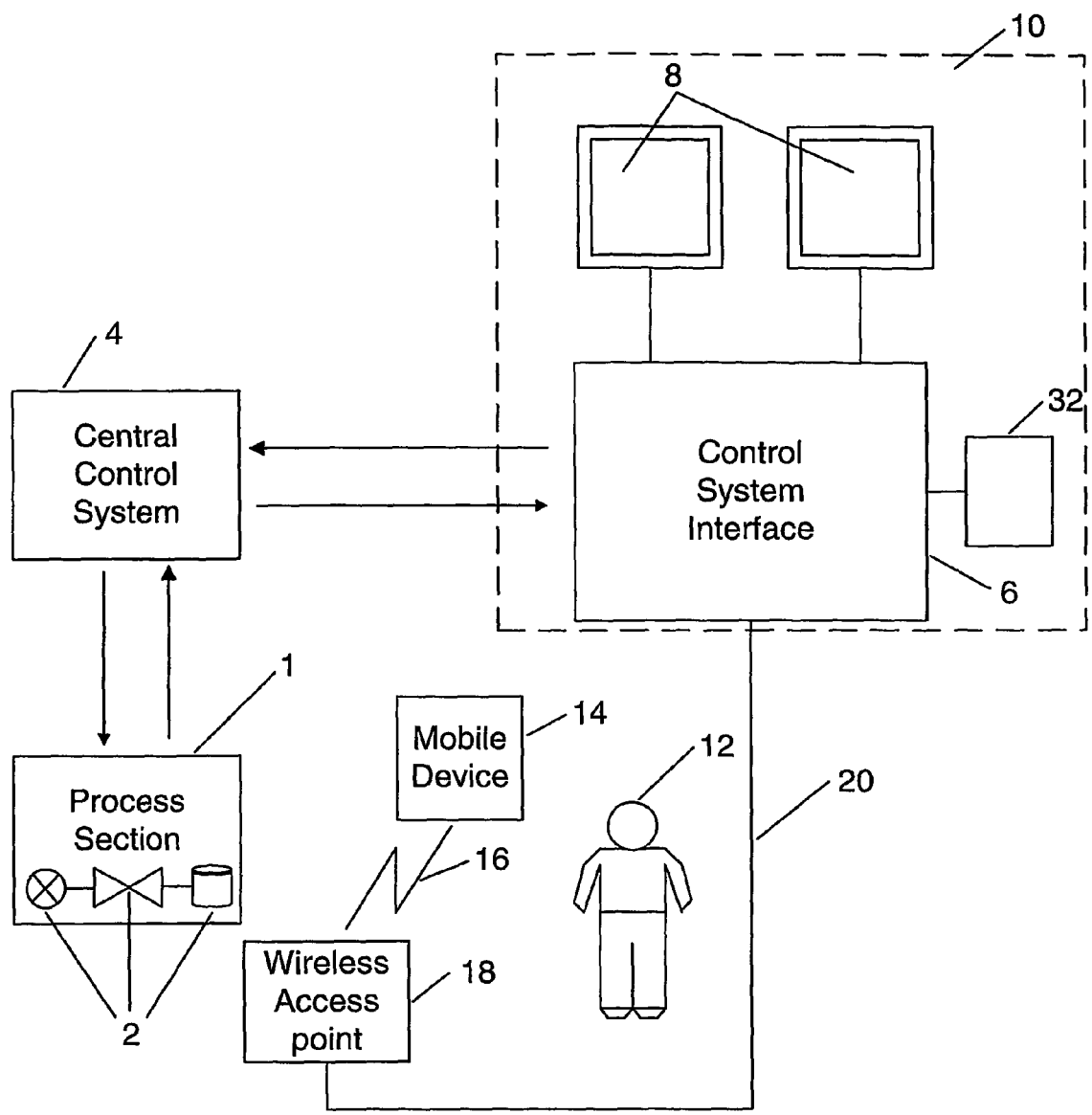
FIG. 1 is a block diagram showing a control system according to an embodiment of the invention provided in an industrial plant.

FIG. 1 is a block diagram showing a control system in an industrial plant. An industrial plant comprises a number of real world objects, such as pumps, motors, valves, etc. A large manufacturing and processing industry is usually divided into a number of process sections, each process section comprising one or more real world objects. A process section may be a large section, such as a production line, a bleaching plant, or a paper machine, or a small section of a process, such as a single apparatus. The objects in a process section are often interconnected to execute a specific process. FIG. 1 shows one process section 1 having a number of objects 2.

The control system comprises a central control system 4, which co-ordinates and controls the process sections over a data network. The central control system 4 receives status information from the process sections and sends control instructions to the process sections over the data network. The control system further comprises a control system interface 6, which provides the ability to send and receive information from the central control system 4. The control system interface 6 sends query and control instructions to the central control system 4. The central control system 4 accordingly returns status information from the process section 1. User interfaces 8, comprising display terminals and keyboards are connected to the control system interface 6. The control system interface 6 and the user interfaces 8 are located in a central control room 10.

During normal production in the plant as well as if there is an alarm or something abnormal occurs, the operator has to physically visit the process section to inspect or gain information about it. According to a preferred embodiment of the present invention, the operator 12 is provided with a mobile wireless unit 14. The mobile wireless device 14 is connected over a communication link 16 to a wireless access point 18. The wireless access point 18 is connected to the control system interface 6 through a data network 20. Thereby, the mobile unit 14 is connected to the central control system 4. A large plant is provided with a plurality of wireless access points 18 spread through the plant and connected to the data network 20. The mobile wireless unit 14 is handheld and portable. A personal digital assistant (PDA) product, such as a Palm Pilot™, a HP Jornada™, a Compaq Ipac™, or a Psion™ can be used as the mobile wireless unit 14. A computerized mobile telephone can also be used as the mobile wireless device 14.

Figure 2:
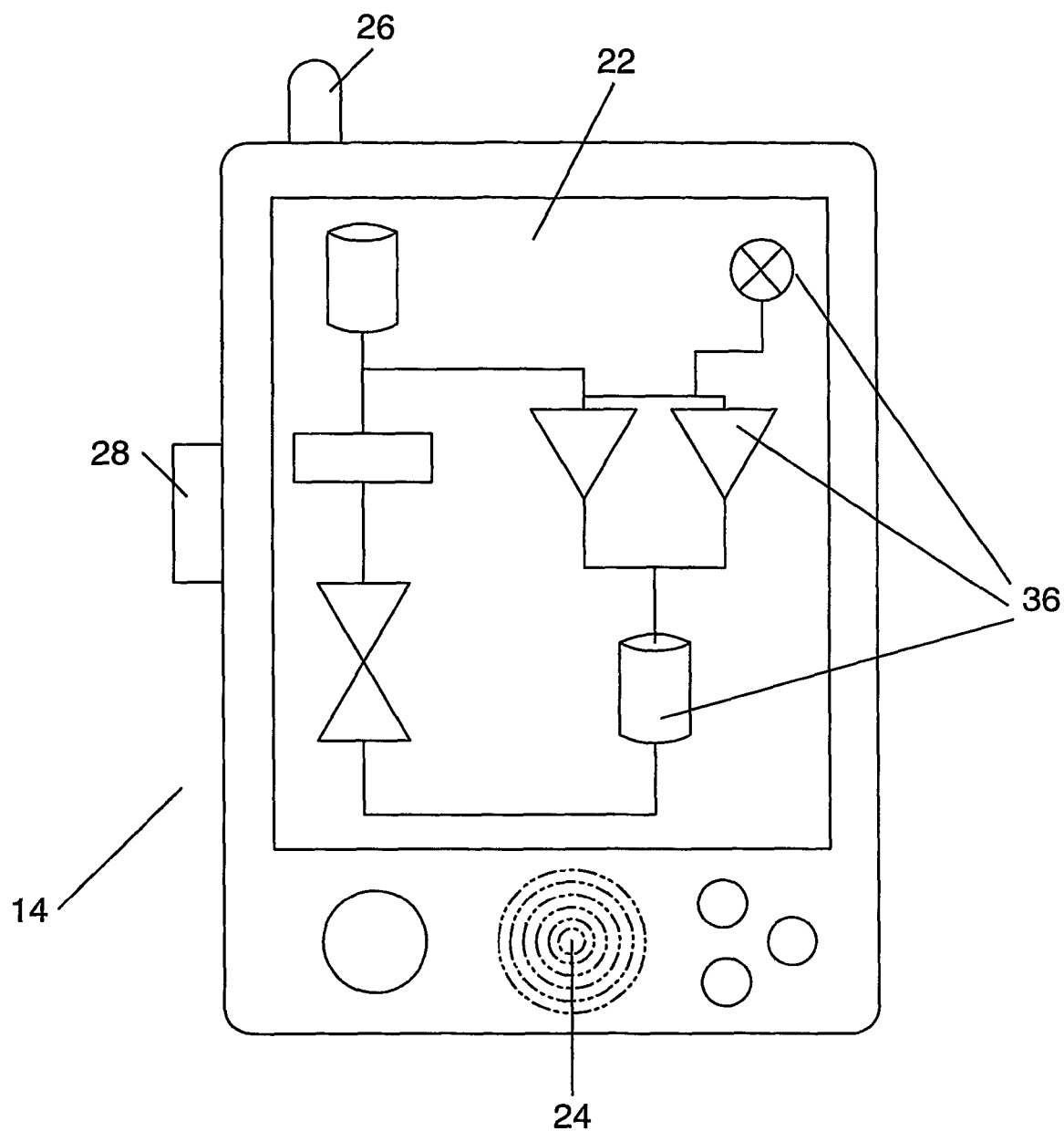
FIG. 2 shows an embodiment of a wireless mobile unit to be used in a control system according to the invention.

FIG. 2 shows a PDA to be used as the mobile unit 14. The mobile unit 14 comprises an output means for outputting information obtained from the central control system. The output means could also be a headset. In this embodiment the output means is a graphical display screen 22. The screen 22 is a touch screen and thus also functions as a first input means. The first input means 22 may also be a keyboard or a mouse. The mobile unit 14 further comprises a second input means 24, which is a microphone. The mobile unit 14 also comprises wireless communication means comprising an antenna 26 that is based on any of the wireless technologies know in prior art. The mobile unit 14 is also provided with a record button 28, which upon activation starts the recording of the message and upon deactivation stops the recording.

The mobile unit 14 interacts with the control system interface 6, which provides the mobile unit 14 with graphical symbols representing the objects in the process section being closest to the mobile unit 14 and thus also closest to the user. In this embodiment, the display 22 is a graphical display, but in another embodiment, it may have a simple text-based display. Preferably, the mobile unit 14 is a thin client, i.e. a hardware device running software that uses fewer and smaller amounts of resources, such as processing power and memory.

The present invention enables a user to record a message when he is somewhere out in the plant away from the control room. The recorded message is transferred to the control system interface 6 and presented in the control room. When the user moves around in the plant, the mobile unit 14 approaches one of the wireless access points 18. The wireless access points 18 may be distributed over a relatively large area in the industrial plant. The mobile unit 14 sets up a communication link 16 with a wireless access point 18 in its vicinity by methods known in prior art. The communication link 16 permits the user to communicate with the control system interface 6. The process section 16 closest to the mobile unit 14 is then determined using information regarding placement of the wireless access points 18 in the industrial plant. Thus, once the mobile unit 14 establishes a communication link 16 with anyone of the access points 18, the location of the mobile unit 14 is determined by the control system interface 6.

The control system interface 6 provides the mobile unit 14 with a process display of the process section including symbols representing the real world objects in the process section. The real world objects are represented with graphical representations 30 on the display screen 22. If the user moves to another process section in the plant, automatically a new process display representing the objects in the new process section will be shown on the display screen 22. The control system interface 6 maintains one or more databases 32, which contain information regarding the process sections in the vicinity of each wireless access point. In this embodiment, the database 32 also contains the recorded messages. But alternatively, the recorded messages may be stored in the mobile unit 14.

When the user notices something he wish to make a note about in connection with one of the real world objects, he selects the object on the screen 22 by the first input means. In this embodiment, the screen 22 is a touch screen and the user selects the object by pointing at the graphical representation of the object on the screen. When the object is selected, the user starts the recording by pushing the record button 28. The user leaves his message in the microphone 24 and the message is recorded. The recording is stopped when the user releases the record button 28. The voice message is transferred to the control system interface 6 in wav-format and is stored associated with the selected object in the database 32. Thus, the message is accessible from any user interface 8 connected to the control system.

The voice message is preferably converted into a text string before it is stored. In one embodiment of the invention, the message is stored both as a voice message and a text string. Thereby, it is possible for a user to choose if the message is to be presented as a voice message or as a text string. Alternatively, the message may be stored only as a voice message and the message is presented by playing the voice message. As an alternative to the record button 28, each graphical object could be provided with a pop up menu showing the option "record a message". It is also possible to view the text or listen to the stored messages from the mobile unit 14.

Figure 3:
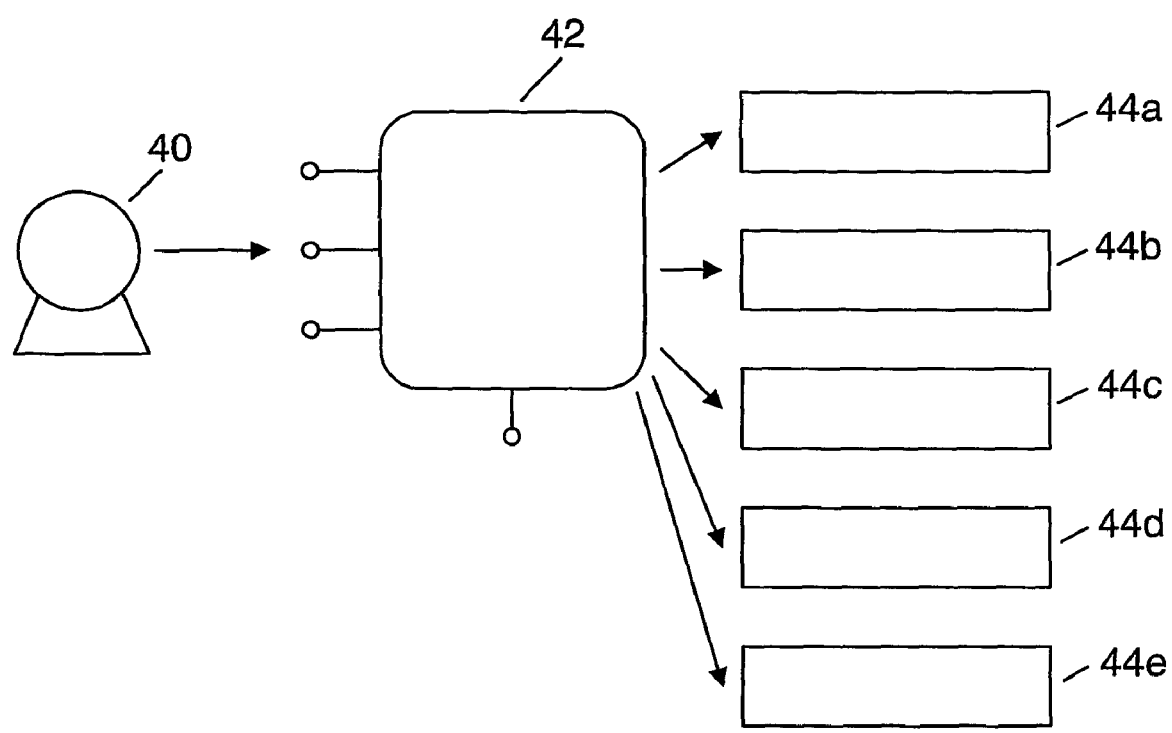
FIG. 3 shows a real world object and its software representation.

In the control system, a real object, a subsystem, or a process section is represented using a software object. FIG. 3 shows a real world object 40 and its software representation 42. Different facets of the real world object 40, such as its physical location, the current stage in a process, a control function, a user interface, a simulation model, some documentation about the object, and other features, may each be described as different aspects of the software object 42. Thus, each software object 42 contains a list of aspects 44*a-e*. The list of aspects is presented to the operator when the object is selected, for example as a pop up menu. The software objects 42 representing the real world objects are denoted Aspect objects. An Aspect object 42 is a container holding different Aspects related to the real world object.

An Aspect represents one facet of the real world object and is responsible for all operations on that facet of the object and is its data. For example a pump: one Aspect represents the physical location of the pump, one Aspect represents a blueprint diagram of the pump, one Aspect represents a security description for the pump, one Aspect represents control of the operation of the pump, and one Aspect represents documentation about the pump. The Aspect that represents the facets has an association to a software module performing the function of the Aspect. Referring to the above example, the Aspect is associated to a software module performing the function displaying the blueprint diagram or controlling the operation of the pump. The Aspect objects are, for example, implemented as COM-objects.

According to the invention, one of the Aspects 44d represents the function "record a message" and another Aspect 44e represents "present the recorded message". When a message is recorded, the Aspect 44d "record a message" is activated. In this embodiment, pushing the record button 28 activates the Aspect 44d. When the message is to be presented, the user activates the Aspect 44e and the "present a message" function is activated. The user activates the Aspect 44e by choosing that Aspect from the pop up menu received upon clicking on the graphical symbol representing the object on the screen of user interface 8.

Figure 4:
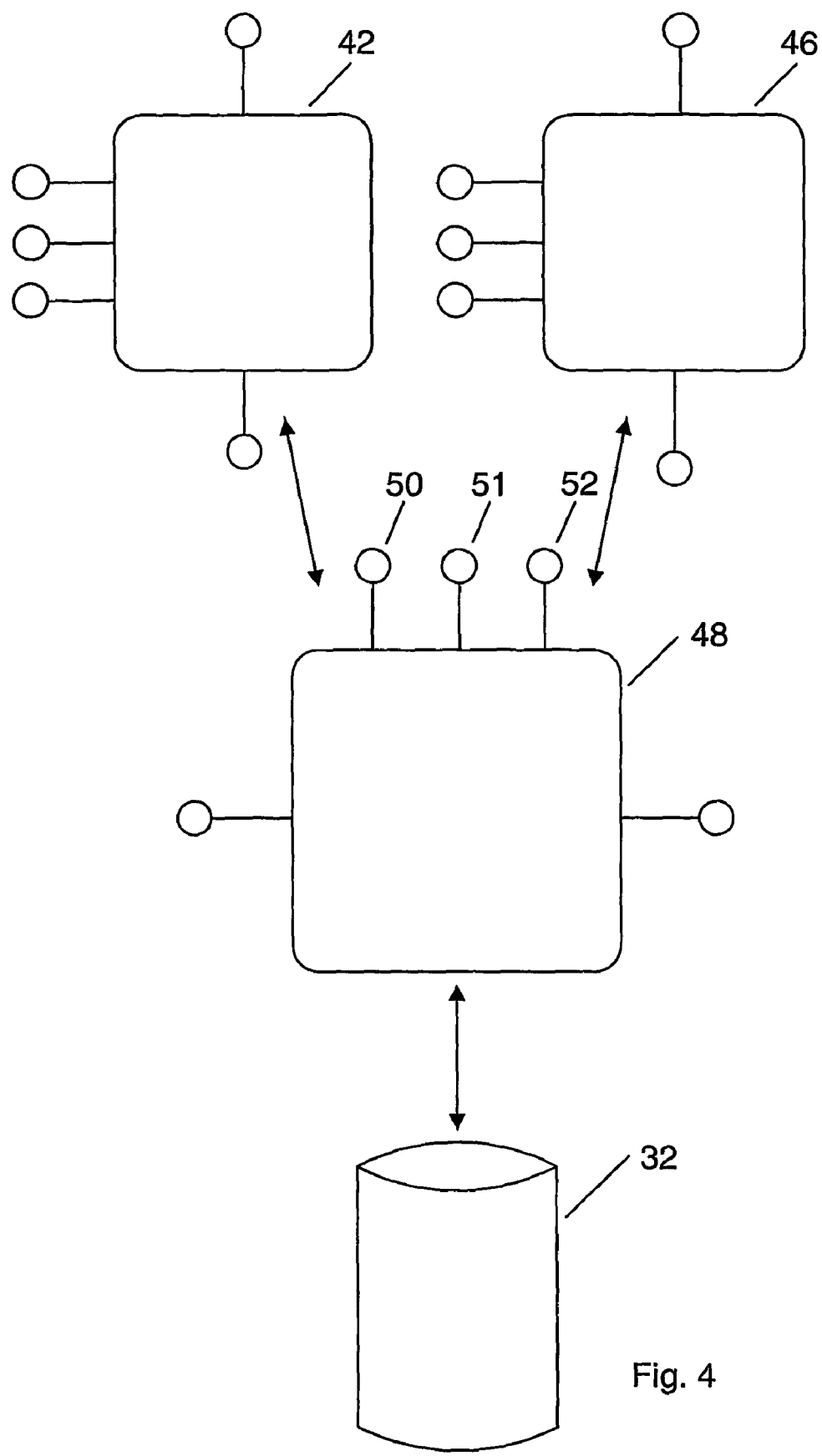
FIG. 4 shows schematically the handling of a message by software objects according to an embodiment of the present invention.

FIG. 4 shows schematically the handling of a message by the software in the control system according to an embodiment of the present invention. As mentioned above, software objects 42, 46, represent the real world objects. The software also comprises a second type of software object adapted for carrying out a specific function. This second type of software object is denoted an Aspect module and its task is to implement the aspects of the objects. The Aspect modules are common to all of the objects in the control system. An Aspect module 48 performs the functions: record a message, store the message, and present the message. Each Aspect objects 42, 46 may invoke the function of the Aspect module 48.

In this embodiment, the Aspect module 48 is implemented as a COM-object. The Aspect objects and modules are implemented with interfaces according to a known standard for COM-object. Besides the interfaces defined in the COM-standard, the software module 48 comprises interfaces 50, 51, 52 for recording, storing, and presenting the messages. The Aspect module 48 stores the messages in the database 32 of the control system. The mobile device 14 acts as a web client and the control system interface 6 acts as a web server. The Aspect objects 42, 46 function as clients in relation to the Aspect module 48, which functions as a server. The above described mechanism makes it possible to extend the functionality of the control system by adding Aspects to the Aspect objects, where each Aspect brings one piece of functionality.

The control system also includes the features: remove a message, store multiple messages per object, use visual indication on the user interface regarding the message category as well as the priority of the message, logging of who played the message, automatically deleting a recorded message after a pre-determined time, for example one hour or one day, whereby the messages are automatically cleaned after the specified period.

When a message has been recorded and stored associated to an object, the presence of the message is indicated on the user interface 8 in the control room. The indication is shown in connection with the graphical representation of the object. The indication is, for example, a flashing spot in the close vicinity of the graphical object. When an operator notices that there is a message connected to the object, he can view the message by selecting the object and choose the display message Aspect on the pop up menu displayed on the screen upon selection of the object. When the Aspect "display message" is activated, the software object 42 invokes the software module 48, which retrieves the message from the database 32 and presents the message on the screen 8.

The method according to the invention is preferably implemented as one or a plurality of co-operating computer programs comprising a plurality of program instructions executing the steps in the method. One computer program is run on a processor in the mobile unit and the other computer program or programs are run on one or more processors in the control system. The computer programs may be provided through a computer readable medium, such as a CD or a diskette, or through a network, such as Internet.

The present invention is not limited to the embodiments disclosed but may be varied and modified within the scope of the following claims. For example, it is possible to record the messages by other devices being arranged in the plant and connected to the control system via a cable, such us a personal computer or a workstation. Alternatively, it is possible to use a laptop computer.

The invention claimed is:

1. A method for handling messages from a mobile user, connected to a control system controlling a plurality of real world objects, the method comprising:
    determining a location of the mobile user moving among the real world objects by detecting a hand-held mobile unit located with the mobile user remote from the control system with a wireless communication network comprising a plurality of wireless access points connected to the control system, connecting the hand-held mobile unit to one of the wireless access points and utilizing information regarding placement of the plurality of wireless access points;
    determining real world objects in the vicinity of the wireless access points,
    wirelessly connecting the hand-held mobile unit located with the mobile user to any of the wireless access points as the mobile user and mobile unit approaches any of the wireless access points,
    representing each real world object closest to the user by a software object on the hand-held mobile unit located with the mobile user after the mobile unit connects to any of the wireless access points, the real world objects represented changing as the user moves among the real world objects,
    selecting by the mobile user with the hand-held mobile unit one of the software objects corresponding to one of the real world objects in the vicinity of the mobile user,
    recording a voice message with the hand-held mobile unit,
    associating the voice message with the software object representing the selected real world object,
    transmitting the voice message and software object representing the selected real world object from the hand-held mobile unit to the control system,
    storing with the control system the message associated with the software object representing the selected object, so that the message is accessible from the control system,
    indicating with a control system interface the presence of a voice message associated with the selected real world object,
    indicating to the mobile user the presence of a voice message associated with real world objects represented on the hand-held mobile unit, and
    upon request, presenting the content of the voice message to any user interface connected to the control system interface.

2. The method according to claim 1, wherein each software object is an Aspect object which contains a set of selectable functions representing different aspects of the real world object, the method further comprising:
    including the functions "record a message" and "present a message" to said set of functions,
    recording a message comprising: activating the "record a message" function of the object, and
    presenting a message comprising: activating the "present a message" function of the object.

3. The method according to claim 1, wherein the handheld mobile unit comprises a user interface and is wirelessly connected to the control system.

4. The method according to claim 3, wherein objects possible to select are displayed on said user interface of the hand-held mobile unit.

5. The method according to claim 3, further comprising:
storing the recorded message in the hand-held mobile unit.

6. The method according to claim 3, further comprising:
presenting the message on a second user interface connected to the control system.

7. The method according to claim 1, wherein the recording, storing and presenting of the message is achieved with one or more software modules common to the software objects in the control system.

8. The method according to claim 1, further comprising:
converting the voice message into a text string, storing the text string and upon request presenting the content of the message by displaying the text string.

9. The method according to claim 1, wherein the recorded message is stored as a voice message and presenting the message to the user comprises playing the voice message.

10. The method according to claim 1, wherein the presence of the message is indicated in connection with a visual representation of the object.

11. The method according to claim 1, further comprising assigning a category and a priority to the message and visually indicating the category and priority of the message.

12. The method according to claim 1, further comprising storing information about who recorded the message and upon request presenting information about who recorded the message.

13. The method according to claim 1, further comprising automatically deleting the message in dependence of a predetermined period of time following the recording of the message.

14. The method according to claim 1, further comprising:
indicating with the hand-held mobile unit the presence of a message regarding the selected object.

15. A computer program product comprising a non-transitory computer readable medium; and computer program instructions recorded on the computer readable medium and executable by a processor for performing the steps of
handling messages from a mobile user, connected to a control system controlling a plurality of real world objects, wherein the control system is arranged in a control room,
determining a location of the mobile user moving among the real world objects by detecting a hand-held mobile unit located with the mobile user remote from the control system with a wireless communication network comprising a plurality of wireless access points connected to the control system, connecting the hand-held mobile unit to one of the wireless access points and utilizing information regarding placement of the plurality of wireless access points;
determining real world objects in the vicinity of the wireless access points, wirelessly connecting the hand-held mobile unit located with the mobile user to any of the wireless access points as the mobile user and mobile unit approaches any of the wireless access points,
representing each real world object closest to the user by a software object on the hand-held mobile unit located with the mobile user after the mobile unit connects to any of the wireless access points, the real world objects represented changing as the user moves among the real world objects,
selecting by the mobile user with the hand-held mobile unit one of the software objects corresponding to one of the real world objects in the vicinity of the mobile user,
recording a voice message with the hand-held mobile unit, associating the voice message with the software object representing the selected real world object,
transmitting the voice message and software object representing the selected real world object from the hand-held mobile unit to the control system,
storing with the control system the message associated with the software object representing the selected object, so that the message is accessible from the control system,
indicating with a control system interface the presence of a voice message associated with the selected real world object,
indicating to the mobile user the presence of a voice message associated with real world objects represented on the hand-held mobile unit, and upon request, presenting the content of the voice message to any user interface connected to the control system interface.

16. A control system adapted for controlling a plurality of real world objects represented as software objects, the method comprising:
means for determining a location of a user by detecting a hand-held mobile unit located with the mobile user remote from the control system with a wireless communication network comprising a plurality of wireless access points connected to the control system utilizing information regarding connection of the hand-held mobile unit to a wireless access point and placement of the plurality of wireless access points,
a hand-held mobile unit remote from the control system and comprising means for determining real world objects in the vicinity of the wireless access points, wirelessly connecting the hand-held mobile unit located with the mobile user to any of the wireless access points as the mobile user and mobile unit approaches any of the wireless access points, means for representing each real world object closest to the user by a software object after the mobile unit connects to any of the wireless access points and changing the real world objects represented as the user moves among the real world objects, means for selecting one of the software objects corresponding to one of said real world objects in the vicinity of the mobile user, means for creating a voice message, and means for associating the voice message with the selected software object representing the selected real world object, and means for transmitting the voice message and software object to the control system remote from the hand-held mobile unit,
a storage unit arranged with the control system for storing the voice message associated with the software object representing the real-world object so that the voice message is accessible from the control system,
means for indicating the presence of the message associated with the selected real world object on the hand-held unit and on an interface of the control system, and
means for, upon request, presenting the content of the message to any user interface connected to the control system.

17. The control system according to claim 16, wherein the handheld mobile unit further comprises a user interface, and means for recording the message, wherein the hand-held mobile unit is wirelessly connected to the control system.

18. The control system according to claim 16, further comprising
a second user interface and said indicating means is adapted for indicating the presence of the message on the second user interface and said presenting means is adapted for presenting the message on the second user interface.

* * * * *